United States Patent
Toedtli et al.

(10) Patent No.: US 11,878,827 B2
(45) Date of Patent: Jan. 23, 2024

(54) METHOD AND CODING LINE FOR SERIALIZING A PLURALITY OF PRODUCTS

(71) Applicant: HICOF AG, Wollerau (CH)

(72) Inventors: Sascha Toedtli, Bäch (CH); Sergej Toedtli, Bäch (CH)

(73) Assignee: HICOF AG, Wollerau (CH)

( * ) Notice: Subject to any disclaimer, the term of this patent is extended or adjusted under 35 U.S.C. 154(b) by 895 days.

(21) Appl. No.: 16/482,943

(22) PCT Filed: Jan. 31, 2018

(86) PCT No.: PCT/EP2018/052359
§ 371 (c)(1),
(2) Date: Aug. 1, 2019

(87) PCT Pub. No.: WO2018/141772
PCT Pub. Date: Aug. 9, 2018

(65) Prior Publication Data
US 2021/0284374 A1    Sep. 16, 2021

(30) Foreign Application Priority Data
Feb. 1, 2017  (EP) ..................... 17154159

(51) Int. Cl.
*B65B 61/26* (2006.01)
*B65B 35/40* (2006.01)
(Continued)

(52) U.S. Cl.
CPC ............. *B65B 61/26* (2013.01); *B65B 35/40* (2013.01); *B65B 35/52* (2013.01); *B65G 47/82* (2013.01)

(58) Field of Classification Search
CPC ......... B65B 35/40; B65B 61/26; B65B 35/52; B65B 63/005; B65B 13/182; B65B 61/025; B65B 61/02
See application file for complete search history.

(56) References Cited

U.S. PATENT DOCUMENTS 3,022,615 A * 2/1962 Schroeder ............... B65B 61/02
                                                    53/496
3,201,912 A * 8/1965 Wozniak .................. B65B 5/06
                                                    53/505
(Continued)

FOREIGN PATENT DOCUMENTS

EP    0959002 A1   11/1999
EP    3070013 A1    9/2016
(Continued)

OTHER PUBLICATIONS

PCT/EP2018/052359, International Search Report, European Patent Office, dated May 16, 2018.
(Continued)

*Primary Examiner* — Daniel Jeremy Leeds
*Assistant Examiner* — Lucas E. A. Palmer
(74) *Attorney, Agent, or Firm* — Ice Miller LLP (57) ABSTRACT

A method and a coding line (128) for serializing a plurality of products in a coding line (128), wherein each product is packed in a cuboid box (114), is disclosed. Herein, the coding line (128) comprises at least one slide (132) and at least one main pusher (130) being adapted for jointly moving the boxes (114) on the slide (132) in a row of the boxes (114) through the coding line (128), wherein the coding line (128) further comprises at least one printing system (118) designed for printing a serial code onto each of the boxes (114), wherein the serial code comprises at least one unique serial number, and at least one camera (120) designed for reading the serial code printed on each of the boxes (114). The method comprises the following steps: a) retracting the main pusher (130) to provide an open space at an initial section (140) of the slide (132) in front of the row of the boxes (114), whereby the open space is filled with at least one additional box (136); b) using the main pusher
(Continued)

(130) to jointly move the row of the boxes (114) on the slide (132) to pass the printing system (118), whereby the serial code is printed onto the at least one box (114), wherein the serial code comprises the at least one unique serial number, and the camera (120), whereby the serial code printed on the at least one box (114) is read, until a final section (146) of the slide (132) is reached, where the row of the boxes (114) is pushed from the slide (132); and c) reloading the coding line (128) by providing at least one further additional box (136), wherein steps a) to c) define a pushing cycle of the coding line (128). Herein, the serial code comprising the at least one unique serial number is printed onto a particular box (114) and, concurrently, stored in a database, preferably together with a further unique identifier (172) applied to a particular shipping case (166) which stores the particular box (114). In this particular embodiment, the method and the coding line (128), thus, allow tracking of a flow of the product packed in the particular box (114) in a distribution chain at any given point.

20 Claims, 7 Drawing Sheets

(51) Int. Cl.
   *B65B 35/42* (2006.01)
   *B65G 47/82* (2006.01)
   *B65B 35/52* (2006.01)

(56) References Cited

U.S. PATENT DOCUMENTS

| | | | | |
|---|---|---|---|---|
| 3,371,767 A * | 3/1968 | Rehr | B65B 35/40 | 53/154 |
| 4,003,185 A * | 1/1977 | Goff | B65B 21/16 | 53/496 |
| 4,067,172 A * | 1/1978 | Paules | B65B 59/00 | 53/506 |
| 4,254,604 A * | 3/1981 | Vogel | B65B 43/325 | 53/376.4 |
| 4,610,347 A * | 9/1986 | Inoko | B65G 47/086 | 198/418.7 |
| 4,809,482 A * | 3/1989 | Horton | B65B 61/26 | 53/287 |
| 4,832,181 A * | 5/1989 | Rugab | B07C 5/3408 | 198/502.3 |
| 4,915,209 A * | 4/1990 | Canziani | B65G 43/08 | 198/456 |
| 4,939,891 A * | 7/1990 | Podini | B65B 5/106 | 53/247 |
| 5,038,911 A * | 8/1991 | Doane | B65G 43/08 | 198/357 |
| 5,105,606 A * | 4/1992 | Creed | B65B 35/38 | 53/499 |
| 5,133,446 A * | 7/1992 | Draghetti | B65G 47/086 | 198/606 |
| 5,187,917 A * | 2/1993 | Mykleby | B65D 75/20 | 53/512 |
| 5,189,863 A * | 3/1993 | Pozzi | B65B 61/20 | 53/493 |
| 5,315,927 A * | 5/1994 | Yeh | B65B 61/26 | 101/DIG. 30 |
| 5,379,575 A * | 1/1995 | Focke | B65B 5/106 | 53/252 |
| 5,666,786 A * | 9/1997 | Focke | B65B 63/02 | 53/529 |
| 5,755,073 A * | 5/1998 | Moncreif | B65B 5/06 | 53/244 |
| 5,794,417 A * | 8/1998 | Mohrman | B65B 5/06 | 53/496 |
| 5,810,487 A * | 9/1998 | Kano | B65B 11/12 | 53/131.2 |
| 6,164,045 A * | 12/2000 | Focke | B65B 5/105 | 198/429 |
| 6,189,727 B1 * | 2/2001 | Shoenfeld | G07F 17/0092 | 221/279 |
| 6,470,653 B1 * | 10/2002 | Lutz | B65B 61/202 | 53/238 |
| 6,561,203 B2 * | 5/2003 | Kajiura | F26B 15/18 | 134/131 |
| 6,658,817 B1 * | 12/2003 | Eve | B65B 61/26 | 53/411 |
| 6,878,222 B1 * | 4/2005 | Os | B65B 59/005 | 156/356 |
| 7,007,791 B2 * | 3/2006 | Stingel, III | B65G 47/8869 | 198/468.8 |
| 7,102,095 B2 * | 9/2006 | Blohm | B07C 1/02 | 209/584 |
| 8,256,192 B2 * | 9/2012 | Cerf | B65D 71/0088 | 53/142 |
| 9,713,911 B2 * | 7/2017 | Cavazza | B65B 43/265 | |
| 10,124,920 B2 * | 11/2018 | Kern | B65B 57/20 | |
| 2003/0146068 A1 * | 8/2003 | Polloni | B65B 61/26 | 198/626.1 |
| 2003/0154692 A1 * | 8/2003 | Parsons | B65B 43/465 | 53/469 |
| 2004/0045676 A1 * | 3/2004 | Chojnacki | B65C 9/02 | 156/360 |
| 2004/0079243 A1 * | 4/2004 | Dittrich | B65B 61/26 | 101/35 |
| 2005/0150187 A1 * | 7/2005 | Raming | G09F 3/0288 | 53/415 |
| 2007/0289256 A1 * | 12/2007 | Sambuca | B65B 51/067 | 53/436 |
| 2009/0001146 A1 * | 1/2009 | Billmann | B65B 61/26 | 53/167 |
| 2009/0038630 A1 * | 2/2009 | Bertuzzi | B65B 63/005 | 131/283 |
| 2010/0018154 A1 * | 1/2010 | Laperche | G01N 21/95 | 53/53 |
| 2011/0011035 A1 * | 1/2011 | Praestholm | B65B 39/02 | 53/529 |
| 2011/0167760 A1 * | 7/2011 | Spix | B65B 5/105 | 53/131.2 |
| 2012/0279882 A1 * | 11/2012 | Prahm | B65B 61/26 | 53/148 |
| 2013/0096711 A1 * | 4/2013 | Gates | B65B 19/32 | 700/110 |
| 2013/0161159 A1 * | 6/2013 | Fisher | B65B 57/14 | 198/633 |
| 2013/0247524 A1 * | 9/2013 | Ford | B65G 65/00 | 53/381.1 |
| 2014/0137510 A1 * | 5/2014 | Lang | B65B 35/40 | 53/55 |
| 2014/0174885 A1 * | 6/2014 | Cavelius | B65G 47/086 | 198/418.9 |
| 2017/0096244 A1 * | 4/2017 | Serra | B65B 35/40 | |
| 2017/0313452 A1 * | 11/2017 | Sutton | B65B 65/02 | |
| 2018/0162573 A1 * | 6/2018 | Brandhorst | B65B 43/56 | |
| 2018/0265234 A1 * | 9/2018 | Sassi | B65B 5/06 | |
| 2018/0297726 A1 * | 10/2018 | Ruben | A61K 36/18 | |

FOREIGN PATENT DOCUMENTS

| | | |
|---|---|---|
| GB | 935142 A | 8/1963 |
| GB | 2150520 A | 7/1985 |
| WO | 2013059252 A1 | 4/2013 |

OTHER PUBLICATIONS

PCT/EP2018/052359, Written Opinion of the International Searching Authority, European Patent Office, dated May 16, 2018.

* cited by examiner

METHOD AND CODING LINE FOR SERIALIZING A PLURALITY OF PRODUCTS

CROSS-REFERENCE TO RELATED APPLICATIONS

The present application is a U.S. national stage patent application of, and claims the priority benefit of International Patent Application Serial No. PCT/EP2018/052359, filed Jan. 31, 2018, and also claims the priority benefit of European Patent Application Serial No. 17154159.2, filed Feb. 1, 2017, the text and drawings of which are hereby incorporated by reference in their entireties.

FIELD OF THE INVENTION

The invention relates to method and a coding line for serializing a plurality of products, wherein each product may, specifically, packed in a cuboid box, wherein a serial code is printed onto the box and wherein the serial code is readable by a camera. Herein, by checking the serial code against a database, an origin of the product can, thus, be traced back the serial code in a distribution chain at any given point. Products in the pharmaceutical, tobacco or food industry which are, usually, produced in high volumes and packed in cuboid boxes, wherein a packaging of the products is performed on automatic packaging lines which include case packers. However, other fields of use of the present invention may also be conceivable.

PRIOR ART

Driven by legal requirements in various countries including but not limited to the United States, European Union, China, Korea, Saudi Arabia, or Turkey, serialization technology is, in general, more and more implemented in the pharmaceutical industry. Similar requirements have become mandatory for tobacco, food and various other products. A description of the serialization technology for use with medical products can be found in Directive 2011/62/EU of the European Parliament and of the Council of Jun. 8, 2011. Basically, it is legally required that each individual package or box, which can, usually, be considered as a smallest selling unit of a product, shall bear a serial code, in particular, comprising a unique serial number, which is printed onto a single box and, concurrently, stored in a database. As a result, the serial code, thus, allows tracking a flow of the product in a distribution chain at any given point. By checking the serial code printed on the box against a corresponding serial code stored in the database, the origin of the product can be traced back.

Most products in the pharmaceutical, tobacco or food industry which are produced in high volumes are, generally, packed in boxes, in particular in cuboid or near-cuboid folding boxes. Thus, the mentioned products are packaged into the boxes on automatic packaging lines which comprise case packers specifically designed for this purpose. Further, specific coding machines are used in this workflow in order to allow printing the serial code onto the boxes. Herein, a conveyor transports the boxes comprising the products along a direction of material flow through the coding machine. A printing system being designated for printing variable data prints, from a side or from above with respect to the box, onto the box the serial code which is, typically, a barcode comprising both a global product identifier and a unique serial number. Afterwards, a camera reads the serial code printed in this manner onto the box and assesses its quality, in particular according to a standard, specifically pursuant to ISO/IEC 15415 or ISO/IEC 15416. If the serial code is assessed to be sub-standard, the box is rejected in a particular station dedicated for this purpose, whereinafter the non-rejected boxes leave the coding machine and are packed either manually or by a specific automatic case packer into a case, specifically, into a shipping case.

Although this known process appears to be considerably easy and straightforward in theory, an actual apparatus which may be designed for performing this process is, usually, highly complex, sophisticated and expensive, specifically, due to high expenses required for initial investment and operation. Herein, a high precision for a conveyor movement having a magnitude of $\pm\frac{1}{100}$ mm is required in order to be able to print the desired serial codes on each box comprising the product, wherein, in order to achieve the required precision, the conveyor movement must exhibit a highly homogenous velocity, wherein any vibrations must be avoided as far as possible.

Further, a surface of the box onto which the serial code is printed must be perfectly perpendicular to a printing head of the printer, thus, requiring sophisticated feeding and box transportation mechanisms. Further, since the boxes must not touch each other to allow determining their position on the conveyor with one or more sensors, a high conveyor speed is required, thus, reducing the quality of the serial code printed on the box, wherein, however, a low quality of the printed serial code may rather likely result in a high rejection rate, thus, reducing an overall efficiency of the whole process.

If high volumes of boxed products are to be packed, boxes are transported to the automatic case packer after a preceding coding step. For this purpose, the products are accumulated on a feeding conveyor by means of a stopper. As soon as the required number of products are accumulated, a holding mechanism, typically, comprising two plates which catches the boxes by pressing the plates from a side and lifts the row of boxes up, thus, giving space on the conveyor for a further row of boxes. This pushing cycle may be repeated in a manner that row over row of boxes may be accumulated between the holding plates until a full stack of boxes is obtained. While one plate is removed, a second plate may shift the stack in a perpendicular direction into the case, thus, forming an additional product layer in the case. As a result, the automatic case packers are expensive, require a lot of factory space, and are inflexible with respect to any change of size of the box designated for receiving the product. In order to perform a process of aggregation, expensive high-resolution cameras are required, in addition, whereby the automatic case packer may be enabled to correlate the serial code of the product inside the case with the serial number of the case.

OBJECT OF THE INVENTION

Accordingly, the object of the present invention is to provide a method and a coding line for serializing a plurality of products which at least partially overcome the shortcomings and/or problems of known methods and coding lines. In particular, the method and the coding line shall be designed for serializing a plurality of products each comprised in a cuboid box in a manner that exactly one particular serial code which, specifically, comprises a unique serial number, is actually printed onto a single box, wherein, by concurrently storing the particular serial code of such a coded box in a database, preferably together with a further unique identifier applied to a particular shipping case which comprises the coded box, a tracking of a flow of the product in a distribution chain at any given point may be possible.

DISCLOSURE OF THE INVENTION

This object is achieved by the invention using the features in the independent patent claims. Advantageous developments of the invention, which can be implemented individually or in any combination, are presented in the dependent claims.

In a first aspect of the present invention, a method for serializing a plurality of products is proposed. Herein, the method according to the present invention comprises at least the following steps a) to c), wherein, however, additional steps may further be performed. In one embodiment, steps a) to c) may be performed in a sequential approach, commencing with step a), continuing with step b), and finishing with step c), wherein, however, a subsequent step may at least partially be performed concurrently with a previous step. In an alternative embodiment, the mentioned steps may be performed in an integrative approach or in a mixed approach combining the sequential approach and the integrative approach, in particular, for minimizing time required for performing the present method.

The method is configured for serializing a plurality of products in a coding line, wherein each product is packed in a cuboid box, wherein the coding line comprises at least one slide and at least one main pusher being adapted for jointly moving the boxes on the slide in a row of boxes through the coding line, wherein the coding line further comprises at least one printing system designed for printing a serial code onto each of the boxes, wherein the serial code comprises at least one unique serial number, and at least one camera designed for reading the serial code printed on each of the boxes, wherein the method comprises the following steps:
  a) retracting the main pusher to provide an open space at an initial section of the slide in front of the row of the boxes, whereby the open space is filled with at least one additional box;
  b) using the main pusher to jointly move the row of the boxes on the slide to pass the printing system, whereby the serial code is printed onto the at least one box, wherein the serial code comprises the at least one unique serial number, and the camera, whereby the serial code printed on the at least one box is read, until a final section of the slide is reached, where the row of the boxes is pushed from the slide; and
  c) reloading the coding line by providing at least one further additional box, wherein steps a) to c) define a pushing cycle of the coding line.

Accordingly, the method of the present invention is configured for serializing a plurality of products, in particular for products, typically, produced in high volumes as, for example, in the pharmaceutical, tobacco or food industry. However, other kinds of products may also be used for the present method. As usually, at least one product, in particular a single product, is packed in a cuboid box, wherein the term "cuboid box" as used herein comprises cubic boxes or near-cuboid boxes, such as folding boxes, wherein the near-cuboid boxes are distinguished from the cubic boxes by comprising rounded corners at, however, an overall cuboid shape.

Further according to the present invention, wherein the plurality of the products is serialized in a coding line. As used herein the tem "coding line" refer to a device which allows transporting the at least one cuboid box comprising the at least one product along at least one slide, in particular from an initial section of the slide, wherein at least one additional box is inserted on the slide, to a final section of the slide, wherein, after applying the serial code to the at least one box, by which procedural step each of the inserted additional boxes is converted into a "coded box", the at least one coded box is removed from the slide. Herein, the inserting of the at least one additional box to the slide and/or the removing of the at least one coded box from the slide may be formed either manually or automatically, in particular, as described below in more detail.

For the purposes of the present invention, the coding line comprises at least one actuator, which is denoted here by the term "main pusher", which is adapted for triggering a joint movement of at least two boxes on the slide in form of a row of boxes through the coding line by exerting a definite force over a predefined time interval to a single box, wherein, by the triggered movement of the single box, at least one adjacent box may also be moved. As generally used, the term "row" refers to a consecutive arrangement of the at least two boxes along the slide in a direction of material flow through the coding line, wherein their direction of movement along a course of the slide may also be denoted by the terms "forward" or "forward direction". As a result of this arrangement, each box may, thus, be processed along the slide in an individual manner which may, in particular, be applicable to printing the desired unique serial code onto each of the boxes.

In general, the main pusher may be or comprise a servo-driven pushing device being capable providing high positional accuracy, uniform movement and/or fully programmable acceleration characteristics, thus, resulting in a high precision of the movement of the boxes along the slide.

In an alternative embodiment, the main pusher can be implemented in a different manner, specifically, by being or comprising a band conveyor having a conveyor belt being provided with flaps which may be arranged in regular distances on the conveyor belt for transporting the boxes. Herein, the boxes may, preferably, be introduced into the coding line in a synchronized manner in order to ensure that no collision with one of the flaps may occur. As generally used, the term "band conveyor" refers to a band-shaped body, preferably an endless band, by means of which it is possible to act on the boxes, specifically, on a surface of the boxes. As an alternative to an endless band, the band conveyor may also comprise two or more segments, however, it may be designed in full or in part as a segmented band, for example, a link chain. As a further alternative, the endless band may also consist of, or be produced from, in full or in part, a flexible material having a round, oval or polygonal cross section. However, further embodiments for the main pusher may also be feasible.

In a particularly preferred embodiment of the present invention, a pushing force that may be exerted by the main pusher in order to move the row of the boxes along the slide may be monitored, in particular, for detecting at least one missing box in front of the main pusher. As generally used, the term "monitoring" refers to a repetitive measurement of the pushing force, in particular, during the operation of the coding line. Herein, at least one of position, speed and acceleration of the main pusher may be measured, specifically, by using an encoder. However, other kinds of sensors which may be adapted for this purpose can, alternatively, be used. Based on a precise measurement of the power consumption of the servo-controlled pusher, the precise pushing force at any pusher position can be determined. As a result, the pushing force, the position, the speed, and, if applicable, the acceleration of each box within the row of the boxes which are jointly transported on the slide, can, thus, be monitored. As a result of this monitoring, it can be ensured that all desired boxes have actually been injected into the coding line.

As already indicated, the coding line comprises—in particular contrast to the conveyor belt of a prior-art coding machine—a slide for moving the boxes from their insertion to their removal. As generally used, the term "slide" refers to a static base which is designed for transporting the boxes through the coding line in the forward direction. Herein, the base is of slide, preferably, comprises a solid base, in particular, a metallic base, such as a base of steel or aluminum, having a plain surface, wherein a consistency of the surface may, specifically, be selected in order to provide tribological properties which are advantageous for the transport of the boxes and, concurrently, protect the surface, as far as possible, from any abrasion. By way of example, the consistency of the surface can, especially, be achieved by a thermal treatment of the solid base, in particular by a hardening of the steel, an anodization of the aluminum, or a coating with a hard substance or a low friction substance. Further embodiments are, however, possible.

Figure 5A:
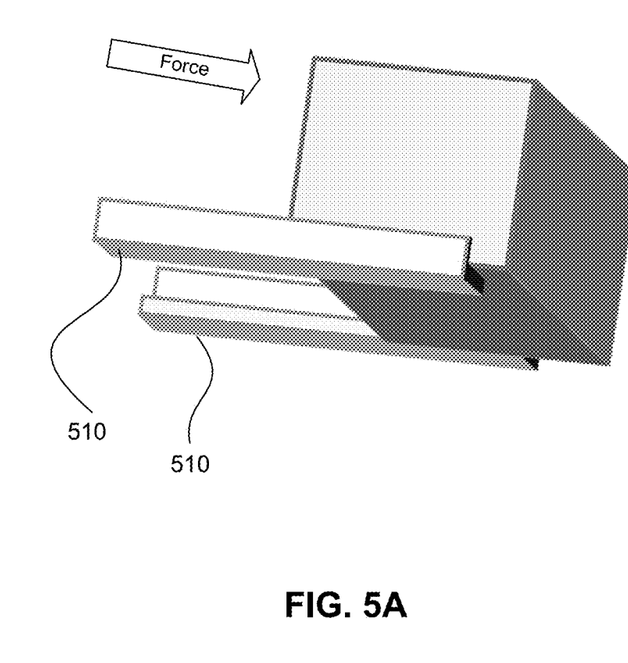
FIGS. 5A to 5B illustrate a particularly preferred embodiment of railings and guides according to the present invention in a perspective view.
Figure 5B:
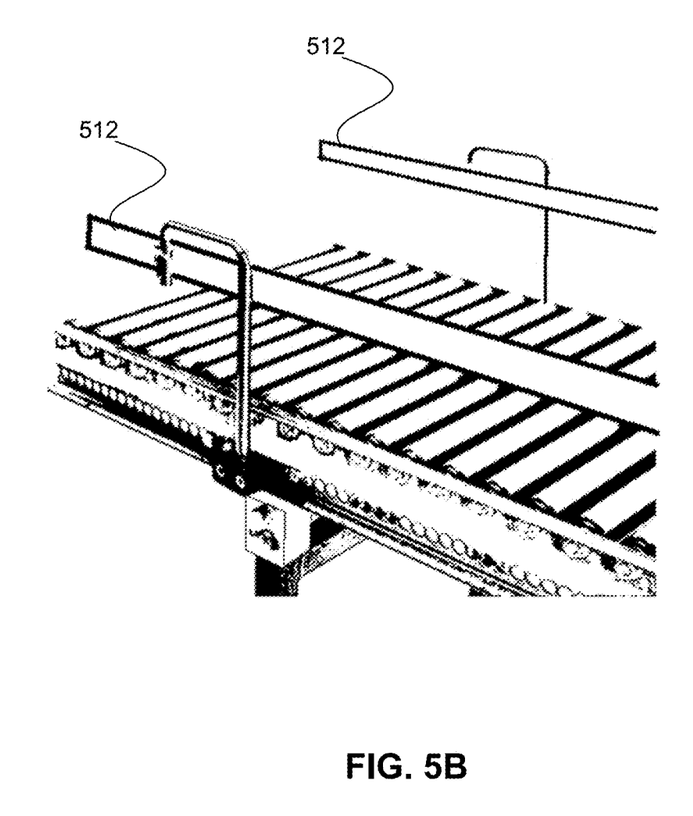

In a further preferred embodiment, the slide may be equipped with guide railings 512 as depicted in FIG. 5B, which may, in general, be arranged on a single side or, preferably, on both sides along the slide. As generally used, the term "guide railings" refers to a lateral support on the slide which is specifically designed for limiting potential a lateral movement of the boxes with respect to the direction of the material flow within the coding line. More specifically, rails can include two L-shaped metal profiles used to shift boxes by means of a pusher force through a machine, while guides can be used to prevent objects falling laterally from a conveyor. Preferably, the guide railings may be adjustable in width, thus, facilitating a handling of boxes having different sizes, in particular, different widths. As a result, a setting of the guide railings can be adjusted in a manner perpendicular to the slide in order to achieve a correct positioning of each box with respect to the lateral extension on the slide. Hereby, it may on one hand, be avoided that the setting of the guide railings may be too loose which may result in a low quality of the print of the serial code onto the box as the box may be capable of exerting a lateral movement during a printing procedure when the guide railings may not be adjusted properly, whereas, on the other hand, it may also be avoided that the setting of the guide railings may be too tight, which may result in an undesired damaging of the boxes. In a particularly preferred embodiment, the guide railing may, preferably, comprise two individual rails 510 each having an L-shape (as depicted in FIG. 5A) which may be designated for positioning the boxes on the slide from below and from the side. As a result, a horizontal element of the L-shaped rail may carry the box, while a vertical element of the L-shaped rail may act as a railing, thus, ensuring a precise lateral positioning of the boxes. In a preferred embodiment, one of the L-shaped rails 510 may be arranged in a fixed position with respect to the slide while the second, mirrored L-shaped rail 510 can, preferably, be adjusted with regard to an individual width of each of the boxes, thus, allowing a flexible use of the slide.

In this particular embodiment, the pushing force exerted by the main pusher may, further, be used for adapting the setting of the guide railings. For this purpose, the pushing force as monitored in a fashion as described above can, further, be compared to a reference value which can be related to represent optimal guide railing settings. A deviation between the actually determined pushing force with respect to an optimal force which may be applicable for a correct setting of the guide railings may, thus, be used for correcting the settings of the guide railings, if required.

According to step a), the main pusher is retracted in order to provide an open space at the initial section on the slide in front of the row of the boxes in order to allow the open space at the initial section on the slide to be filled with at least one additional box. As generally used, the term "open space" refers to a volume above a surface of slide which is designated, in particular with respect to a size of the volume, for receiving the at least one additional box. Herein, the volume is provided as an empty space by retracting the main pusher from this particular volume. As further used herein, the term "filling" refers to inserting the at least one additional box into the volume designated for receiving the at least one additional box. Herein, an introduction of the new or additional box may either be performed manually or automatically, wherein the latter may use a transport medium which may, specifically, be adapted for this purpose, in particular, a conveyor according to the state of the art. Preferably, a further pushing device which is denoted herein as the "feeder pusher" may be used for exerting a stroke for inserting the at least one additional box onto the slide of the coding line, wherein an insertion of the at least one additional box may, preferably, be performed in a direction of material insertion, which may also be denoted by the terms "sidewards" or "sideward direction", since it may, specifically, be oriented perpendicular to the forward direction as defined above. As a consequence of introducing the additional box onto the slide of the coding line according to the present invention by applying the indicated stroke of the feeder pusher, the transport of the boxes can been related to an index, wherein the index may, specifically, be related to a step-by-step movement of the boxes which may be induced by each push stroke of the main pusher, whereby— in particular contrast to prior-art coding machines—a defined pushing cycle may, thus, be generated on the coding line.

As a result of the insertion of the at least one additional box into the coding line, the open space at the initial section on the slide is now filled with at least one additional box. However, prior to adding the at least one additional box to the row of the boxes already existing on the slide, a weight of the at least one additional box may be determined, in particular whether the additional box has a weight which may deviate from a standard weight. For this purpose, the coding line may, preferably, comprise an automatic checkweigher which may, in particular, be located between the feeder pusher and the main pusher at the initial section of the slide at a position where the feeder pusher inserts the at least one additional box onto the slide. Specifically, each additional box may, thus, be placed by the feeder pusher onto at least one weighing plate as comprised by the automatic checkweigher, wherein the at least one weighing plate may be adapted for weighing the at least one additional box. For this purpose, the weighing plate may comprise at least one force measuring sensor, specifically, at least one force measuring sensor one in every corner of a square-sized weighing plate. As a result, a total weight of the at least one additional box may be considered as a sum of all forces measured in every corner of the weighing plate.

In a particular embodiment in which more than one additional box may be feed into the initial section of the slide by applying a single stroke of the feeder pusher, more than one additional box may, concurrently, be transferred onto the weighing plate. Herein, the checkweigher may, preferably, be capable of measuring an exact weight of each individual additional box in order to determine whether the individual additional box has a non-standard weight and may, thus, be ready for a rejection. For this purpose, a plurality of weighing plates can, preferably, be used. Each of the weighing plates may, preferably, comprise at least two weight measuring cells which may be positioned perpendicular to the direction of material flow at edges of each weighing plate. Based on the weights determined by each measuring cell, the individual weight of each additional box can be determined by splitting the total weight of all additional boxes proportionally according to known dimensions of the boxes and, further, to their known exact position on the weighing plates.

According to step b), the main pusher is, subsequently, applied in order to jointly move the row of the boxes comprising the at least one additional box on the slide from the initial section of the slide to the final section of the slide. By this kind of movement of the main pusher, a retraction of the main pusher as performed during step a) can, thus, be reversed. Herein, on their course along the slide the each of the boxes comprised by the row of the boxes, subsequently, to pass the printing system, the camera, and optional further stations, specifically one or more of a labeler, a tamper evident labeler, and/or a reject unit, until each of the boxes as comprised by the row of the boxes reaches the final section of the slide, where the row of the boxes is pushed from the slide, either manually or automatically in a manner as described below in more detail.

As already indicated, each of the boxes as comprised by the row of the boxes, subsequently, passes the printing system, whereby the serial code is, preferably in a sideward direction, printed onto at least one side of the at least one box. Herein, the printing device may, preferably, comprise a laser or an inkjet printer. However, other kinds of printing devices may also be feasible as long as a variable printing of the desired serial code onto the box passing the printing device may be possible. In particular, in the embodiment in which the main pusher can be or comprise a servo-driven pushing device which is capable of providing high positional accuracy, uniform movement and/or fully programmable acceleration characteristics, the resulting high precision of the movement of the boxes may, in particular, be advantageous for an improved operation of the printing device, specifically with respect to precision and quality of the serial code which is printed on the boxes.

Herein, the term "serial code" refers to a unique identifier which, usually, comprise a global product identifier and a unique serial number applicable to a single product as comprised by the single box. In particular, the serial code may be represented by a barcode, specifically, by a linear or a one-dimensional barcode which generally represents data by varying width and spacings of parallel lines, or a two-dimensional barcode being adapted to represent data in an arrangement of bars, rectangles, squares, hexagons, or any other geometric pattern distributed over a limited two-dimensional area, or a dot code comprising a specific number of dots distributed over a limited two-dimensional area. Herein, the particular barcode may be generated by using a standard specification, which may be selected from the group consisting of:

- a linear barcode 128, as defined according to standard ISO/IEC 15417;
- a data matrix barcode, as defined according to standard ISO/IEC 16022;
- a QR barcode, as defined according to standard ISO/IEC 18004; and/or
- a dot matrix barcode, as defined in ISO/IEC TR 29158, wherein, in case of doubt, each standard may refer to a version of the respective standard at the date of filing of this document. However, other standard or non-standard specifications which may allow generating the serial code may also be feasible. In addition to printing the serial code onto the at least one box by using the printing device, the serial code or the at least one unique serial number as comprised by the serial code is, additionally, stored in a database.

As further indicated, each of the boxes as comprised by the row of the boxes, subsequently, passes the camera, whereby the serial code which has been printed on the at least one box by using the printing device as described above is read and, subsequently, assessed in order to obtain information related to serial code, specifically, to a precision and a quality of the serial code which has been printed before on the box under investigation. Herein, the at least one rejected box may be rejected by the reject unit after checking at least one quality property of the box, wherein the at least one quality property of the box may comprise at least one of a weight of the box, a position of the serial code on the box, a quality of the serial code on the box, at least one of a position of the label on the box, and a quality of the human-readable text of the label on the box. For this purpose, any camera which may be designed for reading a serial code and to check the print quality of the human readable text by an optical character recognition algorithm may be used. By way of example, the camera may be at least one one-dimensional or two-dimensional digital camera, for example with a CCD and/or CMOS chip. However, other types of cameras can also be used. The camera may use the information related to serial code to provide it to a database or, as described below in more detail, for triggering a reject unit.

In a particular embodiment, the coding line can further comprise at least one labeler which may be arranged at any position along the slide. As generally used, the term "label" refers to a substrate being attached onto a surface of the box which may present data in alphanumeric, graphic or electronic being used for providing information related to the product as comprised by the box. The information as presented on the at least one label may include price information, codes, such bar codes, data matrix codes QR codes, Electronic Data Interchange (EDI), identification codes or other product codes, such as a universal product code, Radio-Frequency Identification (RFID) labels, country of origin labels, registration marks, trademarks, symbols for product certifications, proof of purchase marks, notes providing conformance to a regulation, such as to a weight and measures accuracy regulation, e.g. a CE marking, environmental and/or recycling symbols, such as a recycling code, a resin identification code and/or a "Green Dot", special information symbols for hazardous or dangerous goods, food contact material symbols, such as an oval-shaped EC identification mark, health marks for food safety, quality insurance signs, calibration and/or troubleshooting cues. In addition, the label may also be used for presenting the serial code in a human-readable form. As further generally used, the terms "labeler" or "labeling station" refer to a device designated for applying one or more labels onto at least one of a side, a top, or a bottom of the box.

In a particular embodiment, the coding line can further comprise at least one tamper evident labeler which may be arranged after the printing and code verification camera along the slide. As generally used, "tamper evident labels" are applied on at least one flap of the folding box in a manner that a significant part of the label may stick out. This sticking out part of the label may, preferably, be bent over the edge of the label and glued on a body of the box. After the label has been applied, the box cannot be opened any more without damaging the tamper evident label. Therefore, tamper evident labels are capable of protecting the product inside the box from illicit manipulation as every access to the product will be visible by the end user of the product. Depending on the closing orientation of the flap, the tamper evident label may be applied top-down or bottom up.

In a particularly preferred embodiment, the coding line may, further, comprise a reject unit. As generally used, the term "reject unit" refers to a device which is capable of excluding a particular box, which may be denoted by the term "rejected box" from further processing together with the other boxes within the coding line by actually removing it from the slide. In a preferred embodiment the reject unit may, thus, comprise a reject pusher which may, specifically, have a form of a cylinder or a plate, which may, preferably, be arranged perpendicular to the forward direction. The reject unit may, preferably be arranged along the course of the slide, specifically, after the camera which may provide the information related to the serial code to the reject unit or directly trigger the reject unit in order to reject the particular box, also referred to as the "rejected box".

In this particularly preferred embodiment, the coding line may, further, comprise a box buffer, also denoted herein by the term "buffer". As generally used, the terms "box buffer" or "buffer" refer to a device being designed for replacing at least one missing box or rejected box, wherein for the at least one rejected box and for the at least one missing box at least one replacement box is inserted onto the slide, wherein the number replacement boxes equals a sum of the number of the rejected boxes and of the missing boxes. Consequently, at least one replacement box may, thus, be inserted onto the slide during step b), preferably, at the final section prior to the removing of the boxes from the slide.

According to step c), the coding line is, finally, reloaded by providing at least one further additional box to be inserted in to the initial section of the slide. Preferably, the buffer, if any, may, concurrently, be refilled during step c), specifically, by applying a separate refilling stroke which can be exerted by the main pusher. As a result, further replacement boxes which may be required later during the next step b) for replacing at least one next rejected box and/or at least one next missing box.

As indicated above, the boxes which have reached the final section of the slide prior to step c) are pushed from the slide, either manually or automatically. In a particularly preferred embodiment, the coding line further comprises an integrated case packer for a purpose of automatically handling the boxes provided at the final section of the slide. As generally used, the term "integrated case packer" refers to a device which is designed for automatically packing the row of the boxes into a shipping case, in particular, by pushing row of the boxes from the slide into the shipping case.

Specifically, the rows of the boxes which are, consecutively, provided at the final section of the slide are automatically packed in a two-fold procedure via a stacking frame into a shipping case by performing the additional steps d) and e) as follows:
  d) jointly pushing the row of the boxes from the slide using a shifter into a stacking frame, whereby the row of the boxes is placed on a bottom of the stacking frame or on top of an already existing row of the boxes already stocked in the stacking frame; and
  e) jointly pushing a stack of the boxes comprising at least one level of the rows of the boxes stacked on top of each other in the stacking frame using a pusher plate (into the shipping case.

Herein, step d) may, preferably, be performed concurrently with step a) while step e) may, preferably, be performed concurrently with step b) during the pushing cycle of the coding line as described elsewhere in this document in more detail.

Thus, according to step d), the row of the boxes which are, specifically during step c), provided at the final section of the slide are jointly pushed from the slide into a stacking frame by using a shifter. As generally used, the term "stacking frame" relates to a unit which is designed for, consecutively, receiving the rows of the boxes which already carry the desired code and which are lined up at the final section of the slide. As further used herein, the term "shifter" refers to a further pushing device which is designed for feeding the stacking frame with a single row of coded boxes at a particular push stroke exerted by the shifter, particularly, in a direction perpendicular to the slide. As a result, an additional layer of the new boxes is placed either on a bottom of the stacking frame or, in an event in which the bottom of the stacking frame already carries a row of the coded boxes, on top of an existing row of the coded boxes already stocked in the stacking frame. Herein, after placing the additional row of the coded boxes into the stacking frame, the stacking frame may be lowered by a height of the coded box in order to provide further space for the additional layer to be added on top until the stacking frame may be full. Herein, a number of the coded boxes which are to be transferred into the stacking frame may be defined by a packaging scheme of a case, in particular of a shipping case as described below in more detail, which is provided for later receiving the coded boxes. Preferably, each push stroke of the shifter transfers the number of coded boxes adjusted for a full row of boxes into the stacking frame. As a result, the process of stacking the coded boxes may, thus, be simplified since the additional row of the coded boxes may be added to the stacking frame from the top, thereby avoiding a complicated lifting and/or holding mechanism which would otherwise be required when additional rows are added to the stacking frame from the bottom.

According to step e), after the stacking frame may be full with a stack of the coded boxes, wherein the stack may comprise multiple levels of rows, wherein the number of the rows may, preferably, be in accordance with the packaging scheme of the shipping case, a pusher plate may push the whole stack of the coded boxes in a direction perpendicular to the slide from the stacking frame into the shipping case, which may be in an erected position for this purpose. As used herein, the term "pusher plate" refers to a further pushing device which is designed to cover the whole stack of the coded boxes in order to allow pushing the whole stack by applying a single push stroke. As generally used, the term "shipping case" relates to a case which is designated for receiving a plurality of the coded boxes in a predefined arrangement, specifically, in forms of rows and stacks, as well as for transporting the received coded boxes over distances, in particular over long distances, such as in a container that may be carried by a ship but also by a different vehicle designed for transport, such as a truck, a railway carriage, or an airplane. As a result, an additional layer of the boxes comprising the whole stack of the coded boxes may, thus, be formed in the shipping case.

The process of inserting additional stacks of the coded boxes into the shipping case may, thus, preferably, be repeated until the shipping case may be full. Thereafter, a handling of the shipping case may, either manually or automatically, be performed according to further step f) as follows:

f) replacing the full shipping case by a further empty shipping case, wherein the empty shipping case may, specifically, be placed at the location of the full shipping case.

In a preferred embodiment, the shipping case may, additionally, comprise at least one further unique identifier, which may, specifically, be placed on a surface of the shipping case that may be accessible from outside. Herein, the at least one further unique identifier may, specifically, be or comprise a further barcode or an RFID (radio frequency identification device). In this particular embodiment, the coding line may, thus, further comprises a reading device, wherein the reading device may be designated for reading the further unique identifier located on the shipping case and transmitting received data to a database. Herein, the reading device can, preferably be a further camera, similar to the camera as described above in more detail. In the database, the codes of all the coded boxes which have been packed into a particular shipping case and which codes have previously been read by the camera are correlated with the further unique identifier on the shipping case. As a result, a tracing of the serialized products as comprised by the coded boxes within the supply chain may thus be facilitated.

In a further aspect of the present invention, a coding line for serializing a plurality of products, wherein each product is packed in a cuboid box, is proposed. As indicated above, the coding line comprises at least one slide and at least one main pusher being adapted for jointly moving the boxes on the slide in a row through the coding line, wherein the coding line further comprises at least one printing system designed for printing a serial code onto the box and at least one camera designed for reading the serial code printed on the box.

As further indicated above, the main pusher may, therefore, be selected from at least one of a pushing device, or flaps on a belt adapted for pushing the boxes. Preferably, the coding line may comprise at least one sensor, in particular, at least one encoder, which is designed for monitoring a pushing force exerted by the main pusher to move the row of the boxes along the slide for detecting at least one missing box in front of the main pusher.

In a particularly preferred embodiment, the coding line may further comprises guide railings which may be arranged at least partially along at least one side of the slide. Specifically, the guide railings may comprise two individual rails each having an L-shape which may be designated for positioning the boxes on the slide below and from the side. Herein, a horizontal element of the L-shaped rail may be designed for carrying the box while a vertical element of the L-shaped rail may be designed for acting as a railing. In particular, the coding line may, further, comprise at least one unit being designed for adapting the setting of the guide railings, wherein the unit may, specifically, be designed to communicate with the encoder in order to ensure a correct setting of the guide railings.

In addition, the coding line may, optionally comprise further units, specifically at least one checkweigher having at least one weighing plate comprising at least one force measuring sensor designed for determining the total weight of at least one additional box filled into open space. Specifically, the checkweigher may comprise at least two checkweigher plates, wherein each of the checkweigher plates has at least two weight measuring cells, wherein each of the weight measuring cells may, preferably, be positioned perpendicular to a direction of material flow at edges of each of the checkweigher plates.

In addition, the coding line may, optionally, further comprise an integrated case packer being designed for packing the boxes into to a shipping case, preferably via a stacking frame. Specifically, the coding line may, further, comprise a reading device being designed for reading a further unique identifier that may be located on the shipping case.

For further details with respect to the coding line, reference may be made to the description above and/or below.

SHORT DESCRIPTION OF THE FIGURES

Further optional details and features of the present invention may be derived from the following description of preferred embodiments, preferably in combination with the dependent claims. Therein, the respective features may be realized in an isolated way or in arbitrary combinations. However, it is emphasized that the present invention is not limited to the preferred embodiments. Identical reference numbers in the following figures refer to identical elements or to elements having identical or similar functions or to elements corresponding to each other with regard to their functionality. Herein:

DESCRIPTION OF EXEMPLARY EMBODIMENTS

Figure 1:
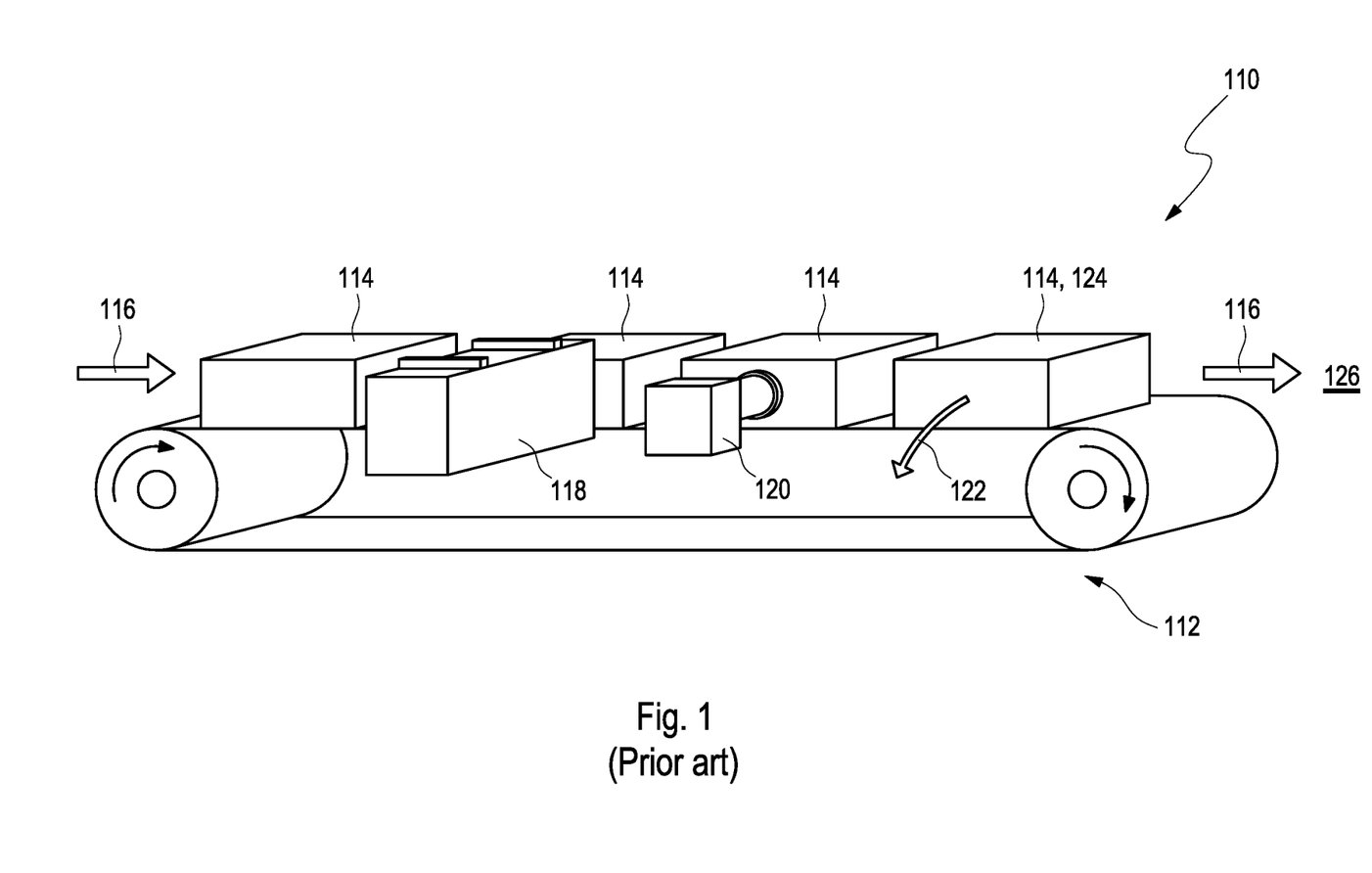
FIG. 1 illustrates an exemplary embodiment of a prior-art coding line.

FIG. 1 schematically illustrates a prior-art coding machine 110 in an exemplary embodiment in which it is, generally, used as 'best practice' solution in industry. Herein, a conveyor 112 transports a plurality of boxes 114, wherein each box 114 comprises a product (not depicted herein), specifically, from the pharmaceutical, tobacco or food industry, in a consecutive manner along a direction 116 of material flow through the coding machine 110, wherein the direction 116 may also be denoted, as already indicated above, by the terms "forward" or "forward direction". Being transported by the conveyor 112 in the forward direction 116, each of the boxes 114, consecutively, passes a printing device 118 which is designated for variably printing a code (not depicted here) onto each box 114. With respect to the forward direction 116, the code is printed, preferably, from a side or from above onto each of the boxes 114. As indicated above, the code is, particularly, a unique identifier which is, usually, selected from a barcode that comprises both a global product identifier and a unique serial number, in particular, a code according to a standard, specifically pursuant to any one of the standards ISO/IEC 15415 or ISO/IEC 15416.

After each box 114 has passed the printing device 118, it is further transported by the conveyor 112 in the forward direction 116 where it, consecutively, passes a camera 120 which is designated for reading the code and, concurrently, assessing a quality of the code, in particular the code according to a standard, specifically pursuant to any one of the standards ISO/IEC 15415 or ISO/IEC 15416. After each box 114 has also passed the camera 120, it is further transported by the conveyor 112 in the forward direction 116 where it, consecutively, passes a reject unit 122. In an event in which the code of a box 114 may have been assessed by the camera 120 as being a sub-standard code, i.e. not being according to the selected standard, the rejected box 124 carrying the sub-standard code may be rejected in the reject unit 122, whereby it can, thus, be excluded from further processing together with the other boxes 114 by actually removing it from the conveyor 112. Finally, all other boxes 114 which have not been rejected by the reject unit 122 leave the coding machine 110, whereinafter they get to a packing station 126 where they are packed, either manually or automatically by using an integrated case packer, preferably, into a case, in particular, into a shipping case.

Figure 2:
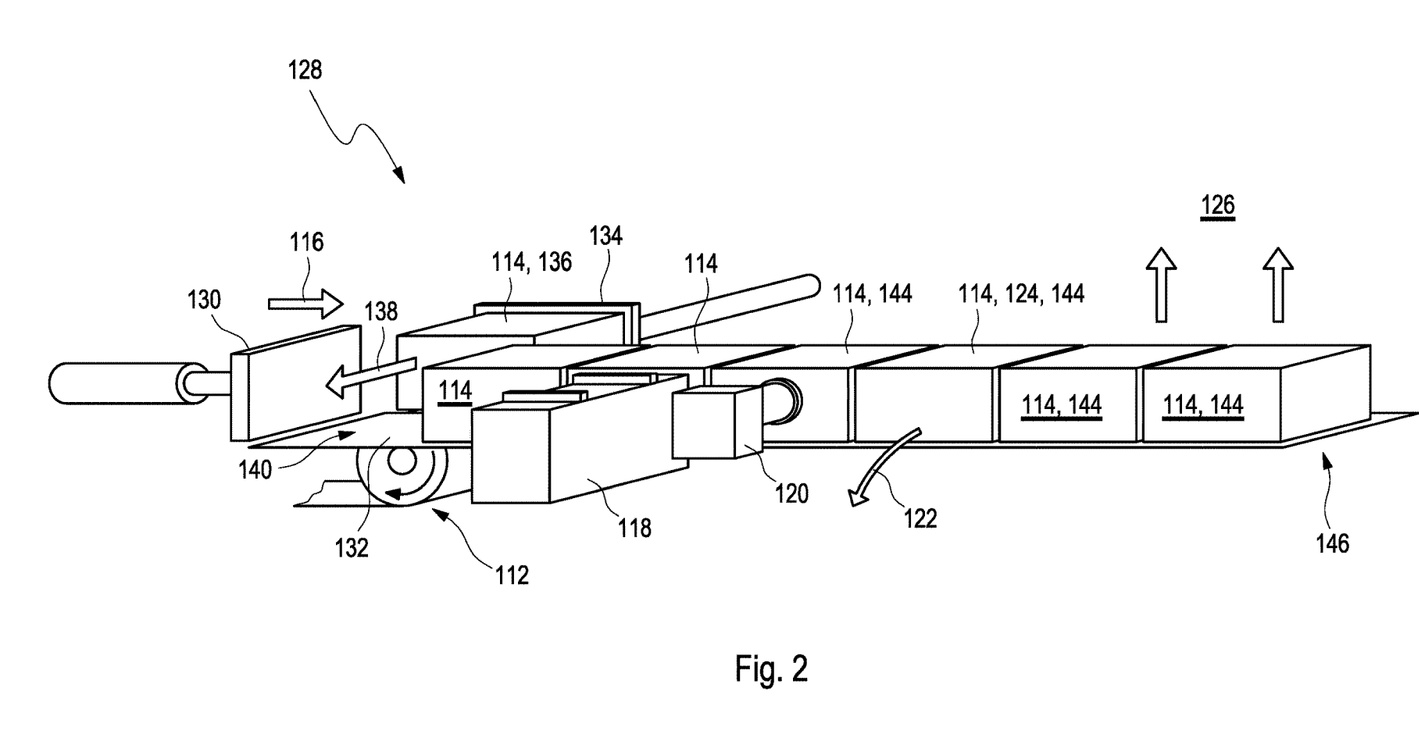
FIG. 2 illustrates a perspective view of a particularly preferred exemplary embodiment of a coding line according to the present invention.

In contrast to the prior-art coding machine 110 as schematically depicted in FIG. 1, FIG. 2 illustrates a perspective view of a particularly preferred exemplary embodiment of a coding line 128 according to the present invention. Instead of using the conveyor 112 in order to transport the boxes 114 in the forward direction 116 as in the prior-art coding machine 110 of FIG. 1, at least one main pusher 130 is provided herein in order to move the plurality of the boxes 114, each of which comprises a particular product (not depicted herein), specifically, from the pharmaceutical, tobacco or food industry, on a static slide 132. In particular, each box 114 is selected from a cuboid box selected from a cubic folding box or a near-cuboid folding box, the latter comprising rounded corners at an overall cuboid shape. Preferably, the plurality of the boxes 114 may exhibit the same size in order to facilitate a transport and serializing through the coding line 128. However, as described below in more detail, guide railings 512 (shown in FIG. 5B) may, additionally, be provided to the slide 132 which may facilitate the processing of boxes 114 that vary in size. In particular contrast to the conveyer 112, the slide 132 is designed herein as astatic base adapted for transporting the boxes 114 through the coding line 128 in the forward direction 116.

In a particularly preferred embodiment, the main pusher 130 can be or comprise a servo-driven pushing device which is capable of providing high positional accuracy, uniform movement and/or fully programmable acceleration characteristics, thus, resulting in a high precision. In an alternative embodiment, the main pusher 130 can be implemented in a different manner, specifically by being or comprising a conveyor having a belt provided with flaps which may be arranged in regular distances on the belt for transporting the boxes 114. Herein, the boxes 114 may, preferably, be introduced into the coding line 128 in a synchronized manner in order to ensure that no collision with one of the flaps may occur, in particular, by shifting the boxes 114 onto the slide 132 using a feeder pusher 134 which is described below in more detail.

In general, the particular arrangement of the coding line 128 according to the present invention allows introducing a new box 136 additionally onto the slide 132 in a direction 138 of material insertion, which may also be denoted by the terms "sidewards" or "sideward direction" since it may, specifically, be oriented perpendicular to the forward direction 116 as defined above. Herein, an introduction of the new or additional box 136 may either be performed manually or automatically, the latter using a transport medium which is adapted for this purpose, in particular, a conveyor which may be similar to the conveyor 112 as shown in FIG. 1. Preferably, a further pusher denoted as the feeder pusher 134 which may, specifically, comprise the pushing device as schematically depicted in FIG. 2, may be used for exerting a stroke for introducing the new box 136 sidewards onto the slide 132 of the coding line 128. As a consequence of introducing the new box 136 onto the slide 132 of the coding line 128 in this manner by applying the indicated stroke, the transport of the boxes 114 can been related to an index, wherein the index may, specifically, be related to a step-by-step movement of the boxes 114 being induced by each push stroke of the main pusher 130, whereby—in particular contrast to the prior-art coding machine 110 as exemplarily shown in FIG. 1—a defined pushing cycle may be generated on the coding line 128.

After the push stroke, when the new box 136 has been completely introduced sidewards onto the slide 132 and the feeder pusher 134 used for this purpose has, subsequently, been fully retracted in a direction opposite to the direction 138 of the material insertion, the at least one main pusher 130 is, subsequently, used to move the new box 136 from an initial section 140 on the slide 132 which is adapted for receiving the new box 136 forward in the direction 116 of the material flow. Herein, the new box 136 is queuing with the at least one box 114 which has been introduced in a previous push stroke onto the slide 132, thus, resulting in a row of boxes 114 is moved forward on the slide 132 of the coding line 128. As a result, the initial section 140 on the slide 132 becomes empty and, thus, ready for receiving a further new box 136 in the next step of the pushing cycle.

By using the main pusher 130, each of the boxes 114 located on the slide 132, subsequently, passes the printing device 118 which is designated for variably printing the code (not depicted here) onto each of the boxes 114, wherein the code is printed, preferably from the side or, alternatively, from above with respect to the forward direction 116, onto each box 114. Herein, the printing device 118 may, preferably, comprise a laser or an inkjet printer. However, other kinds of printing devices 118 may also be feasible as long as they allow variably printing the desired serial code onto the passing box 114.

In a particular embodiment, the coding line 128 can be equipped with at least one labeler (not depicted here), which may be arranged at any position at the coding line 128, such as between the printing device 118 and the camera 120. Herein, the labeler may be designated for applying at least one label onto at least one of a side, a top, or a bottom of the box 114, in particular, in order to provide a human readable text in addition to the machine-readable code and/or to tamper evidence purpose onto the box 114.

Thereafter, each box 114 is further transported on the slide 132 in the forward direction 116 where it, subsequently, passes the camera 120 which is designated for reading the code and assessing the quality of the code. In a manner similar to the description as provided above in conjunction with FIG. 1, the quality of the code may be assessed according to a standard applicable for this purpose, specifically, pursuant to any one of the standards ISO/IEC 15415 or ISO/IEC 15416. However, further kinds of assessments of the quality of the code may also be feasible.

Figure 4:
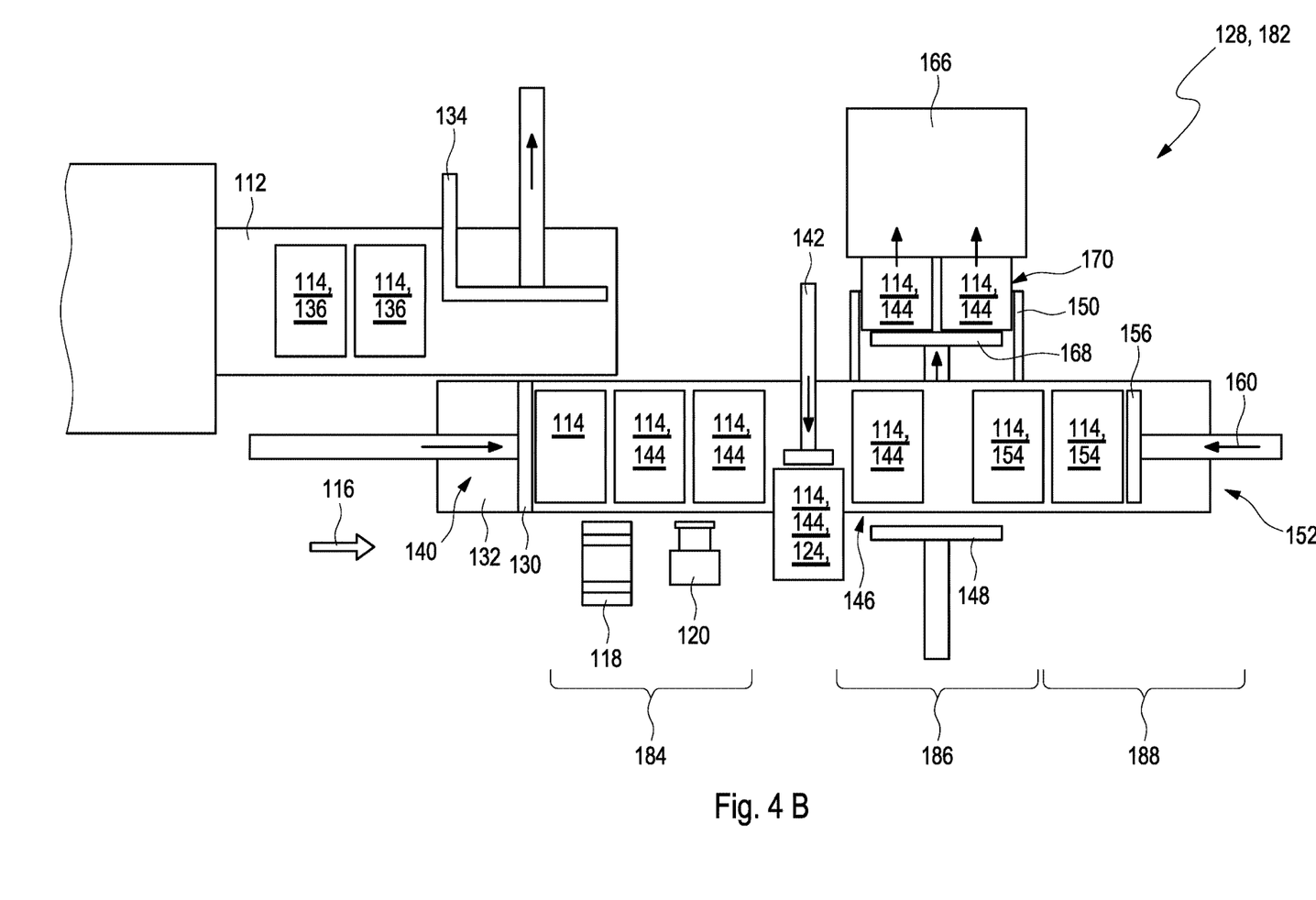
FIGS. 4A to 4C illustrate a particularly preferred embodiment of the pushing cycle of the method according to the present invention in a schematic top view of the coding line.
Figure 4A:
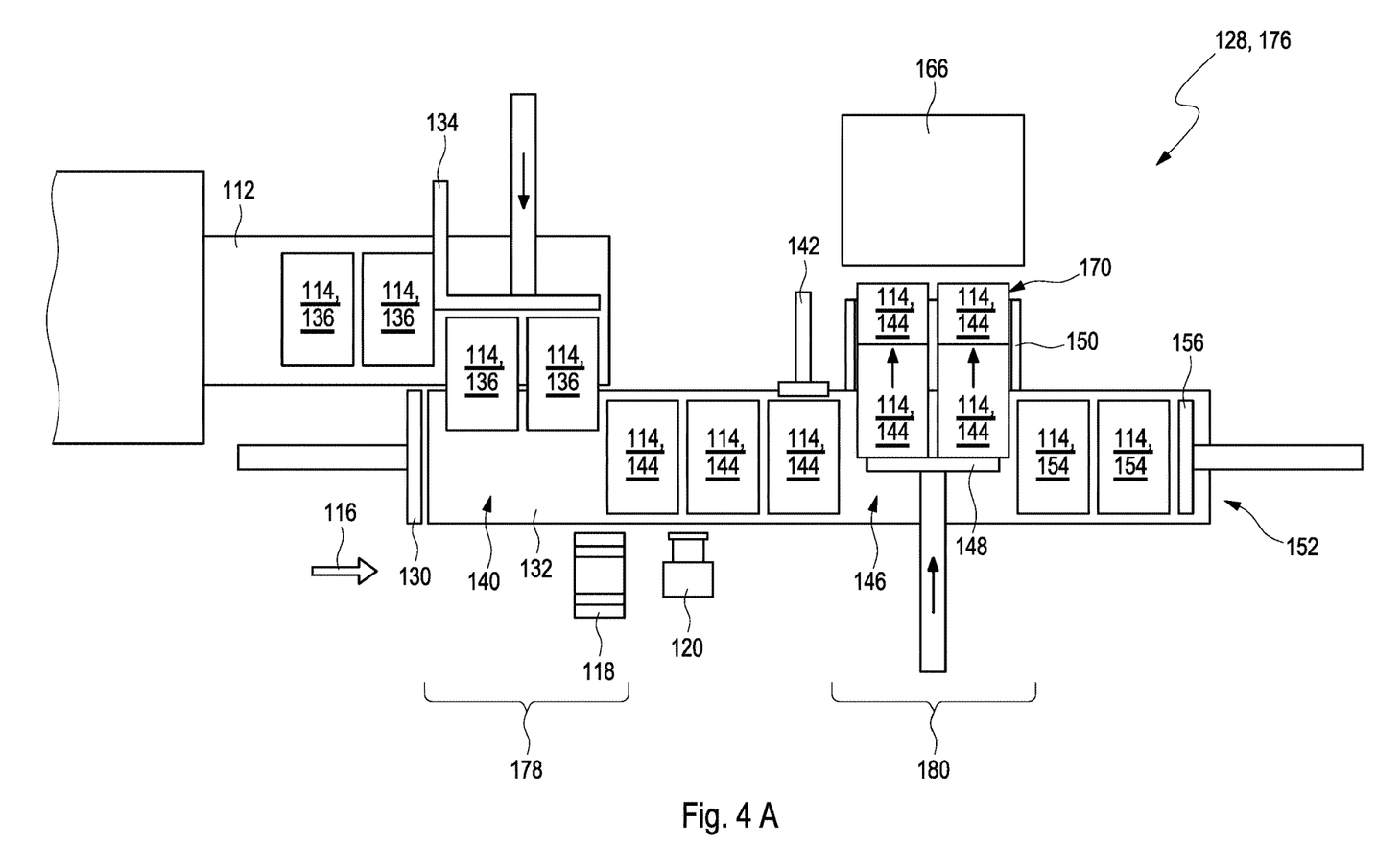

Thereafter, each box 114 is, consecutively, transported on the slide 132 in the forward direction 116 where it, subsequently, passes the reject unit 122. Herein, in the event in which the code having been assessed by the camera 120 as a sub-standard code, the particular box 114 carrying the sub-standard code may be rejected, whereby it may be excluded it from further processing together with the other boxes 114 by actually removing it from the slide 132. In a preferred embodiment as schematically depicted in FIGS. 4A to 4C as described below in more detail, a reject pusher 142, specifically, having a form of a cylinder or a plate, which may, preferably, be arranged perpendicular to the forward direction 116 may be used for this purpose within the reject unit 122.

Finally, all other boxes 114 which have not been rejected by the reject unit 122, which are further denoted herein as coded boxes 144, reach a final section 146 of the slide 132, at which position they can be removed manually or automatically shifted to a packing station 126 where they are filled, in particular, into a case, specifically, into a shipping case as described below in more detail.

Figure 3:
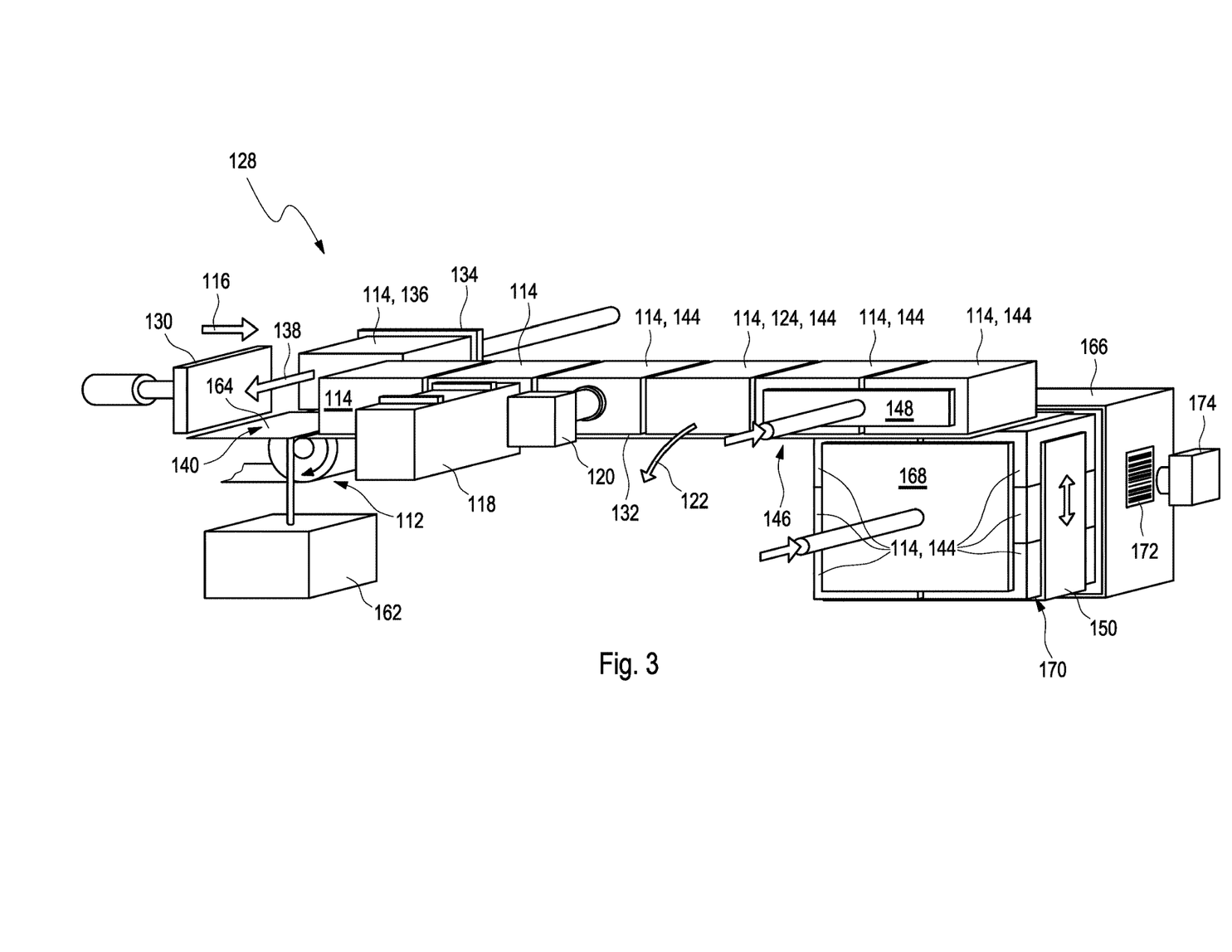
FIG. 3 illustrates a further perspective view of the exemplary embodiment of the coding line according to FIG. 2 comprising an automatic case packer.

In a particularly preferred embodiment as illustrated in FIG. 3, which may especially be designed for high performance of the coding line 128, the at least one feeder pusher 134 for introducing the new boxes 136 into the coding line 128 may be synchronized with at least one further pusher denoted herein as at least one shifter 148 which is designated for feeding a stacking frame 150 being adapted for receiving the coded boxes 144 already carrying the desired code from the final section 146 of the slide 132. However, in an event in which, within a single stroke, a different number of boxes 114 may be introduced into the coding line 128 at the initial section 140 and rejected by the reject unit 122, the operation of the feeder pusher 134 and of the shifter 148 may become asynchronous with respect to the pushing cycle, whereby the process on the coding line 128 may be retarded. As schematically depicted in FIGS. 4A to 4C, this kind of event may be avoided by using a buffer 152 which is designed for providing spare boxes 154 that may be inserted into the final section 146 of the slide 132. In particular, each time the reject unit 122 rejects at least one of the boxes 114, a further pusher denoted as refiller 156 compensates the at least one rejected box 124 by shifting at least one replacement box 158 onto the final section 146 of the slide 132. Once the buffer 152 may be empty, the main pusher 130 may, as depicted in FIG. 4C, refill the buffer 152 with a separate refilling stroke 160.

As indicated above, the slide 132, as used in transporting the boxes 114, can be or comprise a base plate being designed for receiving, keeping and returning the boxes 114 which are moved along a surface of the slide 132 by applying the main pusher 132. Herein, the slide can be a flat plate having dimensions which may be adjusted with respect to a size of the largest boxes 114 and to a maximum number of the boxes 114 expected to be coded within a period of time on the coding line 128. In a particularly preferred embodiment, the slide 132 may have guide railings 512 which may be arranged on a single side or, preferably, on both sides of the slide 132 with respect to the forward direction 116, wherein the guide railings may, preferably, be adjustable in width, whereby boxes 114 having different sizes can, thus, be taken into account. As indicated above, a setting of the guide railings can be adjusted, specifically, in order to achieve a correct positioning of each box 114. Hereby, it may be avoided, on one hand, that the setting of the guide railings may be too loose, thus, resulting in a low quality of the print of the serial code onto the box 114 since the box 114 may be movable during a printing procedure without the guide railings adjusted properly, whereas, on the other hand, it may also be avoided that the setting of the guide railings may be too tight, which may result in a damaging of the boxes 114. Alternatively, the slide 132 may comprise two rails 510 each having an L-shape designed for positioning the boxes 114 on the slide 132 from below and from the side. Herein, a horizontal element of the L-shaped rail may carry the box 114, while a vertical element of the L-shaped rail 510 may act as a guide railing, thus, ensuring a precise lateral positioning of the boxes 114. Preferably, one of the L-shaped rails 510 may be arranged in a fixed position with respect to the slide 132 while the second, mirrored L-shaped rail can be adjusted with regard to an individual width of each of the boxes 114, thus, allowing a flexible use of the slide 132.

The coding line 128 according to the present invention is used for serializing a plurality of products which are packed in the boxes 114, wherein a number of dispensed serial codes as provided by a database is, as particularly preferred, identical with the number of printed codes on the boxes 114. Therefore, in an event in which more than one box 114 may be pushed simultaneously through the coding line 128 by using a single push stroke of the main pusher 130, it may be particularly advantageous to ensure that always the same number of boxes 114 may be injected into the coding line 128 by using the feeder pusher 134. However, in an event in which a lower number of boxes 114 may actually be injected into the coding line 128 by using the feeder pusher 134, at least one of the dispensed serial numbers cannot be printed onto a box 114 since the corresponding box or boxes 114 may be missing, whereby an offset between the queue of codes on the boxes 114 compared to the queue of numbers as provided by the database may be generated.

In order to avoid this kind of event, a pushing force which may be exerted by the main pusher 130 for push the boxes 114 through the coding line 128 may be monitored, thus, allowing a detection of missing boxes (114) in front of the main pusher 130. Hereby, it may, thus, be ensured that all desired boxes 114 have actually been injected into the coding line 128. As indicated above, a linear servo drive may be used for the main pusher 130. This kind of arrangement may, in particular, allow a precise determination of the pushing force exerted by the main pusher 130.

Herein, at least one of position, speed and acceleration of the main pusher 130 may be recorded, specifically, by using an encoder (not depicted here). As a result, the position, the speed, and, if applicable, the acceleration of each box 114 within the row of the boxes 114 which are transported together on the slide 132, can, thus, be acquired. In addition, the pushing force as determined in this fashion may, further, be compared to a reference value which can be related to represent optimal guide railing settings. A deviation between the actually determined pushing force with respect to an optimal force which may be applicable for a correct setting of the guide railings may, thus, be used for correcting the settings of the guide railings, if required.

As further illustrated in FIG. 3, the coding line 128 may, particularly preferred, comprise an automatic checkweigher 162 which may, in particular, be located between the feeder pusher 134 and the main pusher 130 at the initial section 140 of the slide 132 where the feeder pusher 134 introduces the new boxes 136 onto the slide 132. As a result, each new box 136 box may, thus, be placed by the feeder pusher 134 onto at least one weighing plate 164 which is adapted for weighing the new box 136. In case of more than one new box 136 is feed into the initial section 140 of the slide by applying a single stroke of the feeder pusher 134, more than one new box 136 may, concurrently, be transferred onto the weighing plate 164. Herein, the automatic checkweigher 162 can measure an exact weight of each new box 136 to determine whether the new box 136 has a non-standard weight and may, thus, be ready for a rejection. For this purpose, a plurality of weighing plates 164 can, preferably, be used, wherein each of the weighing plates 164 may comprise at least two weight measuring cells positioned perpendicular to the forward direction 116 at edges of each weighing plate 164. Based on the weights determined by each measuring cell, the individual weight of each new box 136 can be determined by splitting the total weight of all new boxes 136 proportionally according to known dimensions of the new boxes 136 and, further, their known exact position on the weighing plates 164.

As indicated above, the coding line comprises the at least one shifter 148 which is designated for feeding the stacking frame 150 being adapted for receiving the coded boxes 144 which already carry the desired code and which are lined up at the final section 146 of the slide 132. Herein, the shifter 148 pushes the at least one coded box 144 orthogonally to the forward direction 116 into the stacking frame 150, thereby adding an additional layer on top of an earlier placed row of the coded boxes 144 in the stacking frame 150. After placing the additional row of the coded boxes 144 into the stacking frame 150, the stacking frame 150 may be lowered by a height of the box 114 in order to provide room for the additional layer to be added on top until the stacking frame 150 may be full. Herein, a number of the coded boxes 144 to be transferred into the stacking frame 150 may be defined by a packaging scheme of a case, in particular a shipping case 166, which is adapted for receiving the coded boxes 144. Preferably, each push stroke of the shifter 148 transfers the number of coded boxes 144 adjusted for a full row of boxes 114 into the stacking frame 150.

Once the stacking frame 150 may be completed, a large pusher plate 168 which may be designed to cover a whole stack 170 of the coded boxes 144 comprising multiple levels of rows in accordance with the packaging scheme of the shipping case 166 pushes the whole stack 170 of the coded boxes 144 sideward with respect to the forward direction 116 from the stacking frame 150 into the shipping case 166 which may be in an erected position for this purpose, whereby an additional layer of the boxes 144 comprising the whole stack 170 of the coded boxes 144 may be formed in the shipping case 166. This process may, preferably, be repeated until the shipping case 166 is full. Thereafter, the shipping case 166 may manually or automatically be replaced by a further empty shipping case 166.

In a preferred embodiment, at least one further unique identifier 172, which may, specifically, be provided in form of a barcode or an RFID (radio frequency identification device), which comprises a unique numeric or alpha-numeric string or a representation thereof, may be applied onto the shipping case 166. For a purpose of reading the unique identifier 172 on the shipping case 166 and transmitting the read data to the database, at least one reading device 174 may be used. In the database, the unique identifiers or code of all the coded boxes 144 which are packed into the shipping case 166, which have previously been read by the camera 120, are correlated with the further unique identifier 172 on the shipping case 166, thus, enabling an easy tracing of the serialized products comprised by the coded boxes 144 within the supply chain.

FIGS. 4A to 4C show a particularly preferred embodiment of the pushing cycle of the method according to the present invention in a schematic top view of the coding line 128. However, it is emphasized here that some of the steps of the pushing cycle or parts thereof illustrated in this embodiment comprise optional features. This particular example shows the processing of the two boxes 114 within a single pushing cycle which is exerted on the coding line 128.

Herein, FIG. 4A schematically illustrates an example of a first phase 176 of the pushing cycle during step a). Herein, in a box inserting step 178, the two new boxes 136 as depicted in FIG. 4A are being inserted into the initial section 140 of the coding line 128. Further, in a concurrently performed box stacking step 180, the two coded boxes 144 which already carry the desired code are being stacked. However, the number of boxes 114 which are processed during the box inserting step 178 and, concurrently, during box stacking step 180 may be different, such as one, three, four or more, specifically, depending on a printing speed which may be provided by the printing device 118.

Further, FIG. 4B schematically illustrates an example of a second phase 182 of the pushing cycle during step b). Herein, a box coding, reading and rejecting step 184, a stack shifting step 186, and a buffering step 188 are, concurrently, performed. As described above in more detail, the box coding, reading and rejecting step 184 comprises printing the desired code onto the two boxes 114 and reading the printed code by the camera 120, whereupon the rejected box 124 is removed from the coding line 128 by the reject unit 122. As further described above in more detail, the stack shifting stack 186 comprises pushing the whole stack 170 of the coded boxes 144 sidewards with respect to the forward direction 116 from the stacking frame 150 into the shipping case 166, preferably, by using an integrated case packer. Further, the buffering step 188 comprises replacing the number of rejected boxes 124 with the same number of replacement boxes 154 as provided by the buffer 152.

Finally, FIG. 4C schematically illustrates an example of a third phase or reloading phase 190 of the pushing cycle during step c). Herein, the coding line 128 is reloaded by providing further two new boxes 136 on the conveyor 112. Concurrently, the buffer 152 is refilled by applying a separate refilling stroke 160 which is exerted by the main pusher 130. Concurrently, the main pusher 130 is retracted according top step a)

For further details with respect to the method according to the present invention, reference may be made to the description of the coding line 128 as illustrated in FIGS. 2 and 3.

LIST OF REFERENCE SIGNS 110 prior-art coding machine
112 conveyor
114 boxed product or box
116 direction of material flow or forward
118 printing device
120 camera
122 reject unit
124 rejected box
126 packing station
128 coding line
130 main pusher
132 slide
134 feeder pusher
136 new or additional box
138 direction of the material insertion or sidewards
140 initial section
142 reject pusher
144 coded box
146 final section
148 shifter
150 stacking frame
152 buffer 154 spare box
156 refiller
158 replacement box
160 refilling stroke
162 checkweigher
164 weighing plate
166 shipping case
168 pusher plate
170 stack of boxes
172 further unique identifier
174 reading device
176 first phase of pushing cycle
178 box inserting phase
180 box stacking phase
182 second phase of pushing cycle
184 box coding, reading and rejecting step
186 stack shifting step
188 buffering step
190 third phase of pushing cycle

The invention claimed is:

1. A method for serializing a plurality of products in a coding line, wherein each product is packed in a cuboid box, wherein the coding line comprises at least one slide and at least one main pusher being adapted for jointly moving the boxes on the slide in a row of the boxes through the coding line, at least one printing system designed for printing a serial code onto each of the boxes, wherein the serial code comprises at least one unique serial number, and at least one camera designed for reading the serial code printed on each of the boxes, the method comprising the steps:
 a) retracting the main pusher to provide an open space at an initial section of the slide in front of the row of the boxes, whereby the open space is filled with at least one additional box;
 b) using the main pusher to jointly move the row of the boxes on the slide to pass the printing system, whereby the serial code is printed onto the at least one box, wherein the serial code comprises the at least one unique serial number, and the camera, whereby the serial code printed on the at least one box is read, until a final section of the slide is reached, where the row of the boxes is pushed from the slide; and
 c) reloading the coding line by providing at least one further additional box, wherein steps a) to c) define a pushing cycle of the coding line,
 wherein at least one of position, speed and acceleration of the main pusher which is driven by a linear actuator is measured by using a encoder so as to acquire at least one of the position, the speed, and the acceleration of each box within the row of the boxes which are transported together on the slide.

2. The method of claim 1, wherein the coding line further comprises at least one checkweigher having at least one weighing plate, wherein the weighing plate has at least one force measuring sensor designed for determining a total weight of the at least one additional box filled into the open space, whereby the total weight of the additional at least one additional box is determined during step a).

3. The method of claim 2, wherein the checkweigher comprises at least two checkweigher plates, wherein each of the checkweigher plates has at least two weight measuring cells, wherein each of the weight measuring cells is positioned perpendicular to a direction of material flow at edges of each of the checkweigher plates, whereby the weight of each additional box is individually determined.

4. The method of claim 1, wherein the coding line further comprises a reject unit, wherein the reject unit is designed for identifying and excluding at least one rejected box from further processing within the coding line, and a buffer, wherein the buffer is designed for replacing at least one rejected box being rejected by the reject unit or a missing box, wherein, during step b), for the at least one rejected box and for the at least one missing box at least one replacement box (158) is inserted onto the slide, wherein the number replacement boxes equals a sum of the number of the rejected boxes and of the number of the missing boxes.

5. The method of claim 1, wherein the coding line further comprises at least one tamper evident labeler designed for applying at least one tamper evident label onto the box by gluing the tamper evident label over an edge of at least one flap of the box, whereby an integrity of the box comprising the tamper evident label against unauthorized opening is ensured.

6. The method of claim 1, wherein the coding line further comprises guide railings being arranged at least partially along at least one side of the slide, wherein a setting of the guide railings is adjusted perpendicular to the slide, whereby the coding line is adapted for processing various box dimensions.

7. The method of claim 6, wherein the guide railings comprise two individual rails each having an L-shape designated for positioning the boxes on the slide from below and from the side, wherein a horizontal element of the L-shaped rail carries the box while a vertical element of the L-shaped rail acts as a railing, whereby a precise lateral positioning of the boxes on the slide is ensured.

8. The method of claim 7, wherein one of the L-shaped rails is arranged in a fixed position with respect to the slide while the second L-shaped rail is adjusted with regard to an individual width of each of the boxes.

9. The method of claim 1, wherein a pushing force exerted by the main pusher to move the row of the boxes along the slide is monitored for detecting at least one missing box in front of the main pusher.

10. The method of claim 9, wherein the pushing force exerted by the main pusher is further used for adapting the setting of the guide railings.

11. The method of claim 1, wherein the at least one unique serial number comprised by the serial code is, in addition to printing the serial code onto the at least one box by using the printing devoice, stored in a database.

12. A coding line for serializing a plurality of products, wherein each product is packed in a cuboid box, wherein the coding line comprises at least one slide and at least one main pusher being adapted for jointly moving the boxes on the slide in a row through the coding line, wherein the coding line further comprises at least one printing system designed for printing a serial code onto the box and at least one camera designed for reading the serial code printed on the box, and wherein the coding line further comprises at least one encoder for measuring at least one of position, speed and acceleration of the main pusher so as to acquire at least one of the position, the speed, and the acceleration of each box within the row of the boxes which are transported together on the slide.

13. The coding line of claim 12, wherein the main pusher is selected from at least one of a pushing device, or flaps on a belt adapted for pushing the boxes.

14. The coding line of claim 12 further comprising guide railings being arranged at least partially along at least one side of the slide.

15. The coding line of claim 14, wherein the guide railings comprise two individual rails each having an L-shape designated for positioning the boxes on the slide from below and from the side, wherein a horizontal element of the L-shaped rail is designed for carrying the box while a vertical element of the L-shaped rail is designed for acting as a railing.

16. The coding line of claim 12, wherein the encoder is designed for monitoring a pushing force exerted by the main pusher to move the row of the boxes along the slide for detecting at least one missing box in front of the main pusher.

17. The coding line of claim 16, further comprising at least one unit designed for adapting a setting of guide railings, wherein the unit is adapted to communicate with the encoder.

18. The coding line of claim 12, wherein the at least one main pusher is adapted for retracting to provide an open space at an initial section of the slide in front of the row of the boxes, whereby the open space is filled with at least one additional box; and the coding line further comprising at least one checkweigher having at least one weighing plate, wherein the weighing plate has at least one force measuring sensor designed for determining a total weight of the at least one additional box filled into the open space.

19. The coding line of claim 12, further comprising an integrated case packer, wherein the integrated case packer is designed for packing the boxes into to a shipping case.

20. The coding line of claim 19, further comprising a reading device, the reading device being designed for reading a further unique identifier on the shipping case.

* * * * *